(12) United States Patent
Lynch

(10) Patent No.: US 10,482,391 B1
(45) Date of Patent: Nov. 19, 2019

(54) DATA-ENABLED SUCCESS AND PROGRESSION SYSTEM

(71) Applicant: Pearson Education, Inc., New York, NY (US)

(72) Inventor: Jay K. Lynch, Arvada, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 810 days.

(21) Appl. No.: 15/134,246

(22) Filed: Apr. 20, 2016

Related U.S. Application Data

(60) Provisional application No. 62/211,156, filed on Aug. 28, 2015.

(51) Int. Cl.
 *G06F 17/30* (2006.01)
 *G06N 99/00* (2019.01)
 *G06Q 10/10* (2012.01)
 *G06N 20/00* (2019.01)
 *G06F 16/9535* (2019.01)

(52) U.S. Cl.
 CPC ......... *G06N 20/00* (2019.01); *G06F 16/9535* (2019.01)

(58) Field of Classification Search
 CPC ........................... G06N 20/20; G06N 16/9535
 USPC .......................................................... 706/12
 See application file for complete search history.

(56) References Cited

U.S. PATENT DOCUMENTS

| | | | |
|---|---|---|---|
| 2003/0144887 A1* | 7/2003 | Debber ................. | G06Q 40/08 705/4 |
| 2013/0226674 A1* | 8/2013 | Field ..................... | G06Q 50/20 705/7.38 |
| 2013/0246317 A1* | 9/2013 | Martin .................. | G06N 20/00 706/12 |
| 2015/0199746 A1* | 7/2015 | Hocking, Jr. ...... | G06Q 30/0282 705/26.7 |

* cited by examiner

*Primary Examiner* — Kuen S Lu
(74) *Attorney, Agent, or Firm* — Quarles & Brady LLP

(57) ABSTRACT

Systems and method for remote intervention are disclosed herein. The system can include a memory including: a user profile database; and a model database. The system can include a user device and a supervisor device, each of which including: a network interface; and an I/O subsystem. The system can include a content management server that can: receive data identifying a user of the user device; retrieve user data for the user from the user profile database; retrieve a risk model from the model database; generate a risk value based on the risk model; generate an action recommendation identifying an action for completion; and generate and send an alert to the supervisor device, which alert includes the action recommendation and includes computer code to trigger activation of the I/O subsystem of the supervisor device to provide the action recommendation.

18 Claims, 15 Drawing Sheets

DATA-ENABLED SUCCESS AND PROGRESSION SYSTEM

CROSS-REFERENCES TO RELATED APPLICATIONS

This application claims the benefit of U.S. Provisional Application No. 62/211,156, entitled "DATA-ENABLED SUCCESS AND PROGRESSION SYSTEM", filed on Aug. 28, 2015, the entirety of which is hereby incorporated by reference herein.

BACKGROUND

This disclosure relates in general to machine learning and alert provision via machine learning. Machine learning is a subfield of computer science that evolved from the study of pattern recognition and computational learning theory in artificial intelligence. Machine learning explores the construction and study of algorithms that can learn from and make predictions on data. Such algorithms operate by building a model from example inputs in order to make data-driven predictions or decisions, rather than following strictly static program instructions.

Machine learning is closely related to and often overlaps with computational statistics; a discipline that also specializes in prediction-making. It has strong ties to mathematical optimization, which deliver methods, theory and application domains to the field. Machine learning is employed in a range of computing tasks where designing and programming explicit, rule-based algorithms is infeasible. Example applications include spam filtering, optical character recognition (OCR), search engines and computer vision. Machine learning is sometimes conflated with data mining, although that focuses more on exploratory data analysis. Machine learning and pattern recognition can be viewed as two facets of the same field. When employed in industrial contexts, machine learning methods may be referred to as predictive analytics or predictive modelling.

While machine learning and alert provision via machine learning are advantageous technologies, new methods and techniques for the application of machine learning and alert provisioning are desired.

BRIEF SUMMARY

One aspect of the present disclosure relates to a system for remote intervention. The system includes a memory including: a user profile database including information identifying one or several attributes of a user; and a model database including a risk model and categorization data identifying a plurality of alert categories. The system includes a user device including: a first network interface configured to exchange data via the communication network; and a first I/O subsystem that can convert electrical signals to user interpretable outputs via a user interface. The system can include a supervisor device including: a second network interface that can exchange data via the communication network; and a second I/O subsystem that can convert electrical signals to user interpretable outputs via a user interface. The system can include a content management server that can include computer code that when executed controls the content management server to: receive data identifying a user of the user device; retrieve user data for the user from the user profile database; retrieve a risk model from the model database; input the user data into the risk model to generate a risk value, which risk value is indicative of the likelihood of the user failing to achieve a predetermined outcome; identify a user categorization according to a classification algorithm; determine a response attribute for the user, which response attribute identifies the degree of a positive or negative user response to an intervention; generate an action recommendation identifying an action for completion, which action recommendation is generated based on the response attribute; and generate and send an alert to the supervisor device. In some embodiments, the alert includes the action recommendation, and the alert includes computer code to trigger activation of the I/O subsystem of the supervisor device to provide the action recommendation.

In some embodiments, identifying the user categorization according to the classification algorithm includes: selecting some of the one or several attributes of the user identified in the user data; determining correspondence of the selected some of the one or several attributes to attributes of each of a plurality of categorizations; and generating an inclusion value for one categorization of the plurality of categorizations, which inclusion value is indicative of a likelihood of the user belonging to that one categorization. In some embodiments, identifying the user categorization according to the classification algorithm further includes: identifying the user categorization as that of the one categorization when the inclusion value is larger than a threshold value. In some embodiments, the plurality of categorizations include: a first category associated with decreased risk in response to an action; and a second category associated with increased risk in response to an action.

In some embodiments, identifying the user categorization according to the classification algorithm includes: selecting some of the one or several attributes of the user identified in the user data; determining correspondence of the selected some of the one or several attributes to attributes to each of a plurality of categorizations; generating inclusion values for each of the plurality of categorizations; and identifying the user categorization as that of the categorization associated with the categorization value indicative of the greatest likelihood of the user belonging to the categorization associated with the inclusion value. In some embodiments, each inclusion value is indicative of a likelihood of the user belonging to a categorization of the plurality of categorizations associated with the inclusion value.

In some embodiments, the action recommendation identifies an intervention. In some embodiments, the risk model is a machine learning model. In some embodiments, the machine learning model is a decision tree learning model. In some embodiments, the content management server can: generate a priority value indicative of relative priority of the action associated with the action recommendation. In some embodiments, the alert can include the priority value.

One aspect of the present disclosure relates to a method for remote intervention. The method includes: receiving at a content management server data identifying a user of a user device, which user device includes: a first network interface that can exchange data via the communication network; and a first I/O subsystem that can convert electrical signals to user interpretable outputs via a user interface; retrieving user data for the user, which user data includes information identifying one or several attributes of the user from a user profile database; and retrieving a risk model from a model database; automatically inputting the user data into the risk model with the content management server to generate a risk value, which risk value is indicative of the likelihood of the user failing to achieve a predetermined outcome. In some embodiments, the method can include: identifying with the content management server a user categorization according to a classification algorithm; determining a response attribute for the user with the content management server, which response attribute identifies the degree of a positive or negative user response to an intervention; generating an action recommendation with the content management server, which action recommendation identifies an action for completion, and which action recommendation is generated based on the response attribute; and generating and sending an alert to a supervisor device from the content management server, which alert includes the action recommendation, and which alert includes computer code to trigger activation of an I/O subsystem of the supervisor device to provide the action recommendation to a supervisor-user.

In some embodiments, identifying the user categorization according to the classification algorithm includes: selecting some of the one or several attributes of the user identified in the user data; determining correspondence of the selected some of the one or several attributes to attributes of each of a plurality of categorizations; and generating an inclusion value for one categorization of the plurality of categorizations, which inclusion value is indicative of a likelihood of the user belonging to that one categorization. In some embodiments, identifying the user categorization according to the classification algorithm further includes: identifying the user categorization as that of the one categorization when the inclusion value is larger than a threshold value.

In some embodiments, the plurality of categorizations include: a first category associated with decreased risk in response to an action; and a second category associated with increased risk in response to an action. In some embodiments, identifying the user categorization according to the classification algorithm includes: selecting some of the one or several attributes of the user identified in the user data; determining correspondence of the selected some of the one or several attributes to attributes to each of a plurality of categorizations; generating inclusion values for each of the plurality of categorizations; and identifying the user categorization as that of the categorization associated with the categorization value indicative of the greatest likelihood of the user belonging to the categorization associated with the inclusion value. In some embodiments, each inclusion value is indicative of a likelihood of the user belonging to a categorization of the plurality of categorizations associated with the inclusion value.

In some embodiments, the action recommendation identifies an intervention. In some embodiments, the risk model is a machine learning model. In some embodiments, the machine learning model is a decision tree learning model. In some embodiments, the method includes: generating a priority value indicative of relative priority of the action associated with the action recommendation. In some embodiments, the alert includes the priority value.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
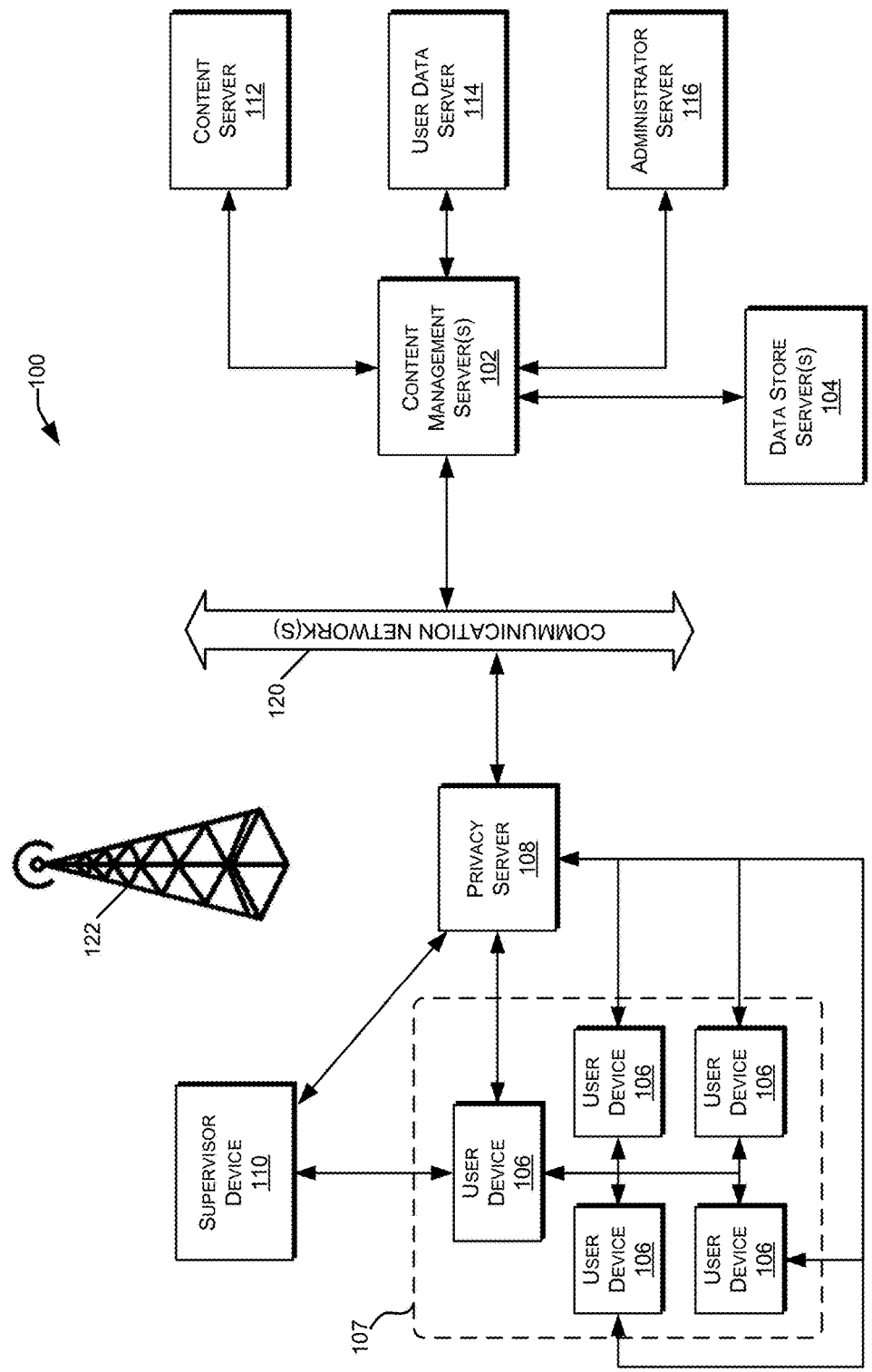
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
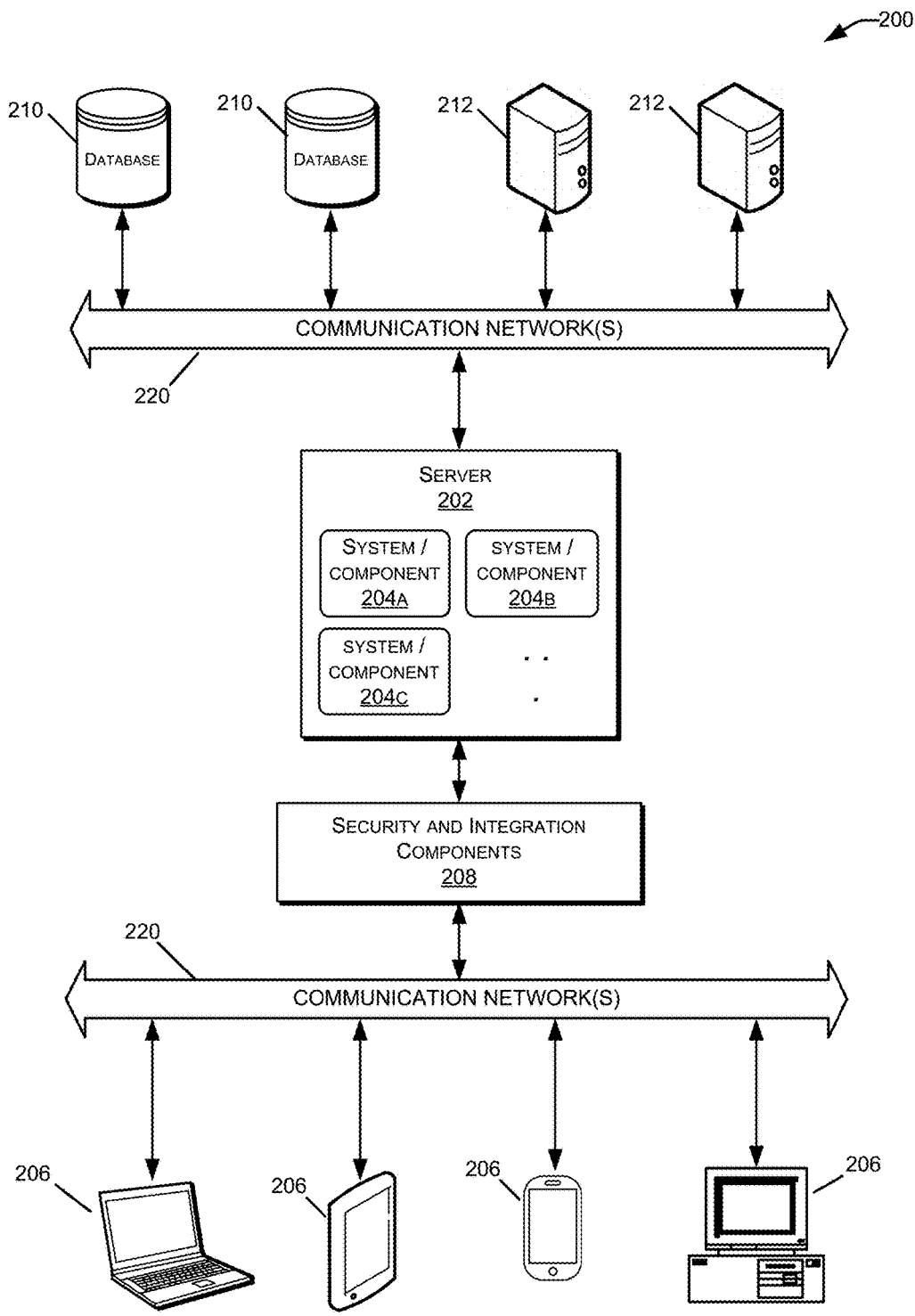
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
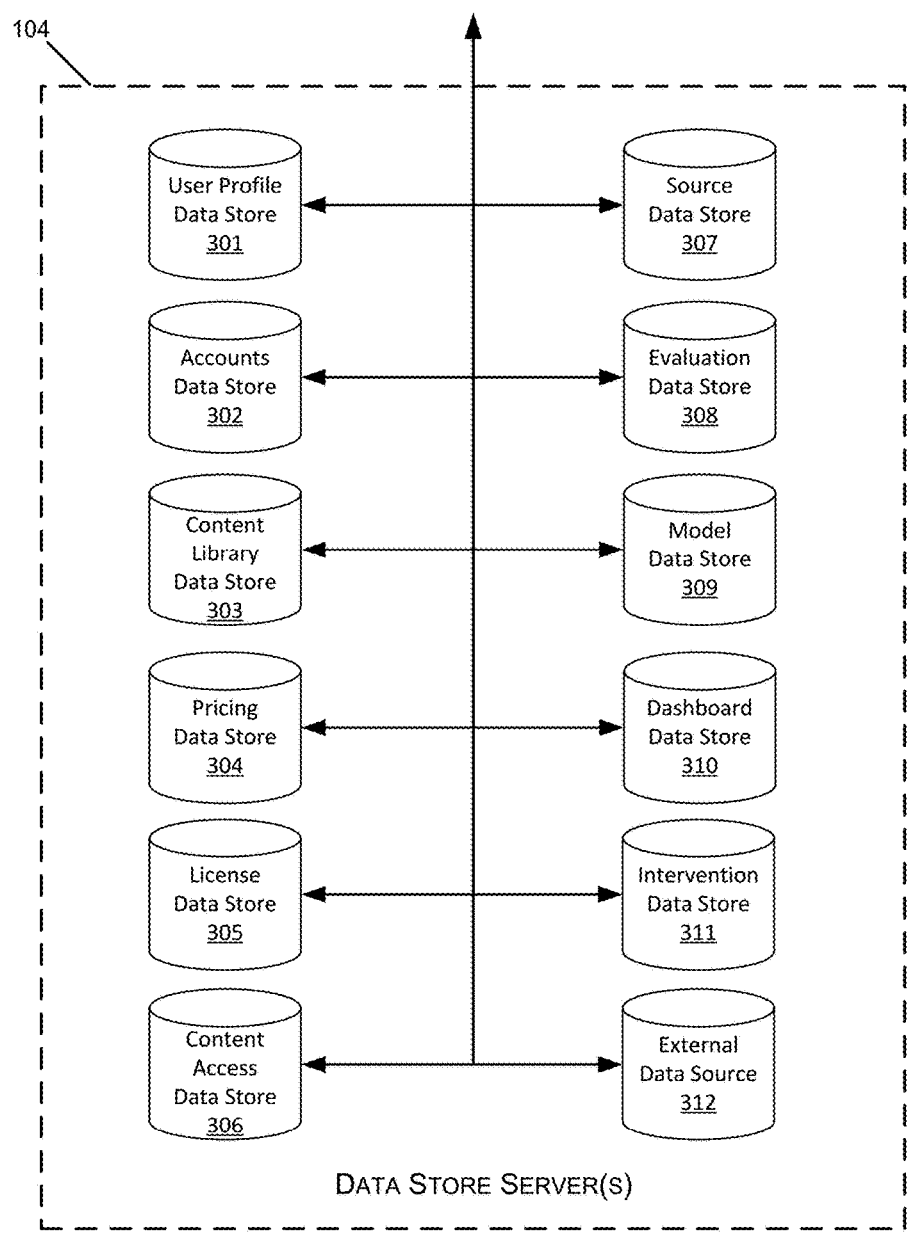
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-312 may reside in storage on a single computer server 104 (or a single server farm or cluster) under the control of a single entity, or may reside on separate servers operated by different entities and/or at remote locations. In some embodiments, data stores 301-312 may be accessed by the content management server 102 and/or other devices and servers within the network 100 (e.g., user devices 106, supervisor devices 110, administrator servers 116, etc.). Access to one or more of the data stores 301-312 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-312, including their functionality and types of data stored therein, are illustrative and non-limiting. Data stores server architecture, design, and the execution of specific data stores 301-312 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, content authors, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile database 301 can include information relating to one or several student-user behaviours including, for example: attendance in one or several courses; attendance and/or participation in one or several study groups; extramural, student group, and/or club involve and/or participation, or the like. In some embodiments, this information relating to one or several student-user behaviours can include information relating to the student-users schedule.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library database 303 can comprise information to facilitate in authoring new content. This information can comprise, for example, one or several specifications identifying attributes and/or requirements of desired newly authored content. In some embodiments, for example, a content specification can identify one or several of a subject matter; length, difficulty level, or the like for desired newly authored content.

In some embodiments, the content library database 303 can further include information for use in evaluating newly authored content. In some embodiments, this evaluation can comprise a determination of whether and/or the degree to which the newly authored content corresponds to the content specification, or some or all of the requirements of the content specification. In some embodiments, this information for use in evaluation newly authored content can identify or define one or several difficulty levels and/or can identify or define one or several acceptable difficulty levels. In some embodiments, for example, this information for use in evaluation newly authored content can define a plurality of difficulty levels and can delineate between these difficulty levels, and in some embodiments, this information for use in evaluation newly authored content can identify which of the defined difficulty levels are acceptable. In other embodiments, this information for use in evaluation newly authored content can merely include one or several definitions of acceptable difficulty levels, which acceptable difficulty level can be based on one or several pre-existing difficult measures such as, for example, an Item Response Theory (IRT) value such as, for example, an IRT b value, a p value indicative of the proportion of correct responses in a set of responses, a grade level, or the like.

In some embodiments, this information for use in evaluation newly authored content can further define one or several differentiation and/or discrimination levels and/or define one or several acceptable differentiation and/or discrimination levels or ranges. As used herein, "differentiation" and "discrimination" refer to the degree to which an item such as a question identifies low ability versus high ability users. In some embodiments, this information for use in evaluation newly authored content can identify one or several acceptable levels and/or ranges of discrimination which levels and/or ranges can be based on one or several currently existing discrimination measures such as, for example, a Point-Biserial Correlation.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these one or several predictive models can be used to: generate a prediction of the risk of a student-user not achieving one or several predetermined outcomes; generate a prediction of a categorization of the student-user, which categorization can indicate an expected effect of one or several interventions on the student-user; and/or generate a prediction of a priority for any identified intervention.

In some embodiments, the risk model can comprise one or several predictive models based on, for example, one or several computer learning techniques. In some embodiments, the risk model can be used to generate a risk value for a student, which risk value characterizes the risk of the student-user not achieving the predetermined outcome such as, for example, failing to complete a course or course of study, failing to graduate, failing to achieve a desired score or grade, or the like. In some embodiments, the risk model can comprise, for example, a decision tree learning model. In some embodiments, the risk model can generate the risk value through the inputting of one or several parameters, which parameters can be one or several values, into the risk model. These parameters can be generated based on one or several features or attributes of the student-user. The risk model, having received the input parameters, can then generate the risk value.

In some embodiments, the categorization model can determine a category of the student-user. In some embodiments, the cateogization model can be used to generate one or several categorization values or identifiers that identify a category of the student-user. In some embodiments, this category can correspond to a likelihood of an intervention increasing or decreasing the risk value. In some embodiments, the categories can comprise a first category in which an intervention decreases the risk value, a second category in which an intervention increases the risk value, and a third category in which an intervention will not affect the risk value. In some embodiments, this third category can be further divided into a first group in which the student-users will likely fail to achieve the desired outcome regardless of intervention, and a second group in which the student-users will likely achieve the desired outcome regardless of intervention. In some embodiments, the categorization model can determine the category of the student-user through the input of one or several parameters relevant to the student-user into the categorization model. In some embodiments, these parameters can be generated from one or several features or attributes of the student-user that can be, for example, extracted from data relating to the student-user.

In some embodiments, the priority model can determine a priority value, which can be a prediction of the importance of any determined intervention. In some embodiments, this priority model can be determined based on information relating to the student-user for which the priority value is determined. In some embodiments, this priority value can be impacted by, for example, the value of the course associated with the risk value. In some embodiments, for example, the priority value may indicate a lower priority for a risk in a non-essential course. In such an embodiment, priority can be determined based on the credits of a course, based on the relevance of a course to, for example, a degree or major, based on the role of the course as a pre-requisite to subsequent courses, or the like.

A dashboard database 310 can include information for generating a dashboard. In some embodiments, this information can identify one or several dashboard formats and/or architectures. As used herein, a format refers to how data is presented in a web page, and an architecture refers to the data included in the web page and the format of that data. In some embodiments, the dashboard database 310 can comprise one or several pointers to other databases for retrieval of information for inclusion in the dashboard. Thus, in one embodiment, the dashboard database 310 can comprise a pointer to all or portions of the user profile database 301 to direct extraction of data from the user profile database 301 for inclusion in the dashboard.

An intervention data source 311, also referred to herein as an intervention database can include information relating to one or several interventions, also referred to herein as one or several actions. In some embodiments, this information can identify the one or several interventions, and how to implement the one or several interventions. In some embodiments, these interventions can include, for example: a contact such as an email, a text, a telephone call, or an in-person visit; a recommendation such as suggested supplemental material or suggested involvement in a study group; a modification to enrollment or to the student-user schedule, or the like.

In some embodiments, the intervention database 311 can comprise dashboard data. In some embodiments, the dashboard data can include data identifying one or several alternate dashboard formats and/or architectures. In some embodiments, these one or several formats can comprise the resizing and/or rearrangement of one or several items in the dashboard (dashboard items), and the one or several architectures can comprise the addition or subtraction of data from the dashboard and the resizing and/or rearrangement of one or several items in the dashboard.

In addition to the illustrative data stores described above, data store server(s) 104 (e.g., database servers, file-based storage servers, etc.) may include one or more external data aggregators 312. External data aggregators 312 may include third-party data sources accessible to the content management network 100, but not maintained by the content management network 100. External data aggregators 312 may include any electronic information source relating to the users, content resources, or applications of the content distribution network 100. For example, external data aggregators 312 may be third-party data stores containing demographic data, education related data, consumer sales data, health related data, and the like. Illustrative external data aggregators 312 may include, for example, social networking web servers, public records data stores, learning management systems, educational institution servers, business servers, consumer sales data stores, medical record data stores, etc. Data retrieved from various external data aggregators 312 may be used to verify and update user account information, suggest user content, and perform user and content evaluations.

Figure 4A:
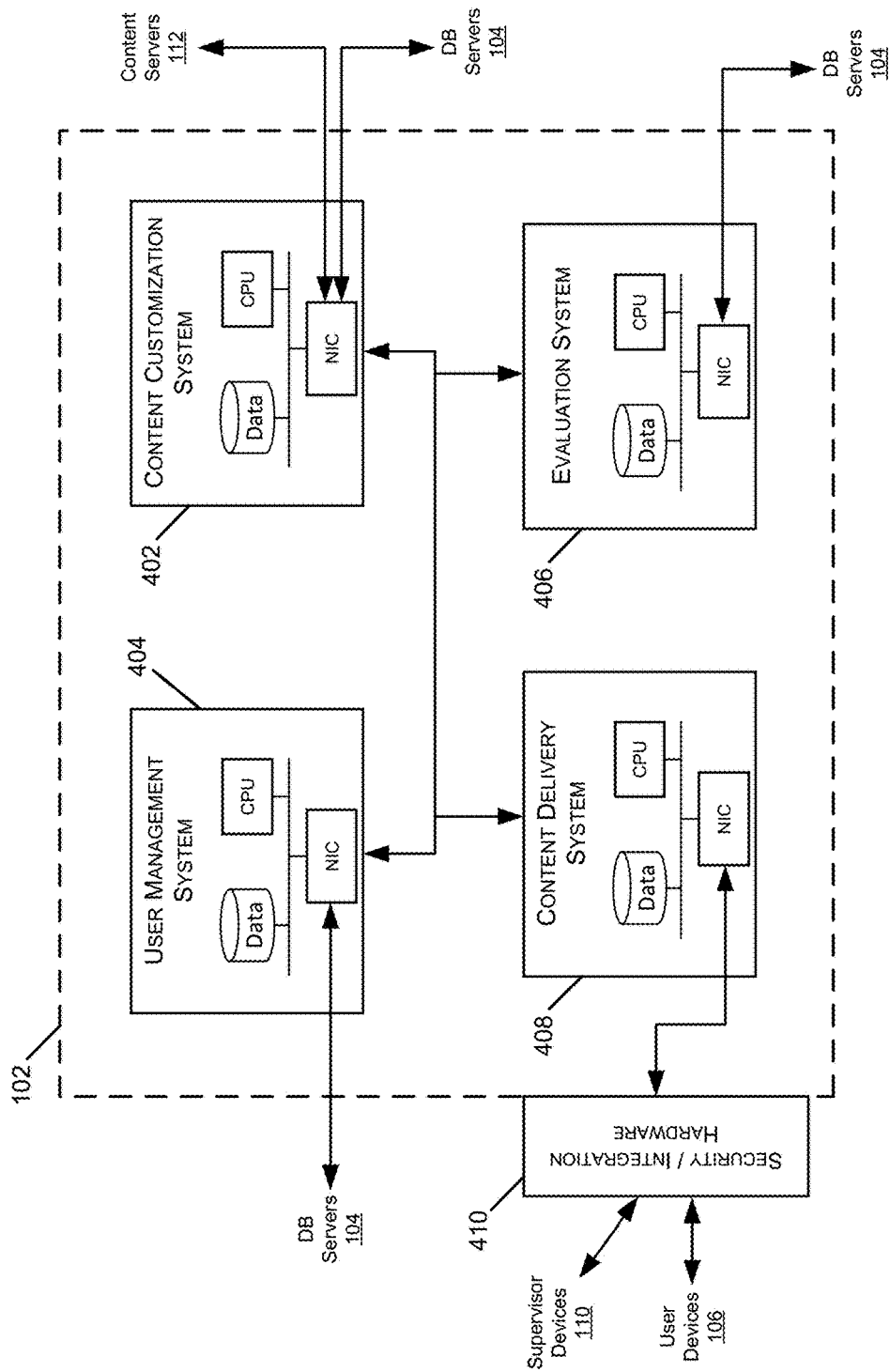
FIG. 4A is a block diagram illustrating an embodiment of one or more content management servers within a content distribution network.

With reference now to FIG. 4A, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406, also referred to herein as a response processor. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 4B:
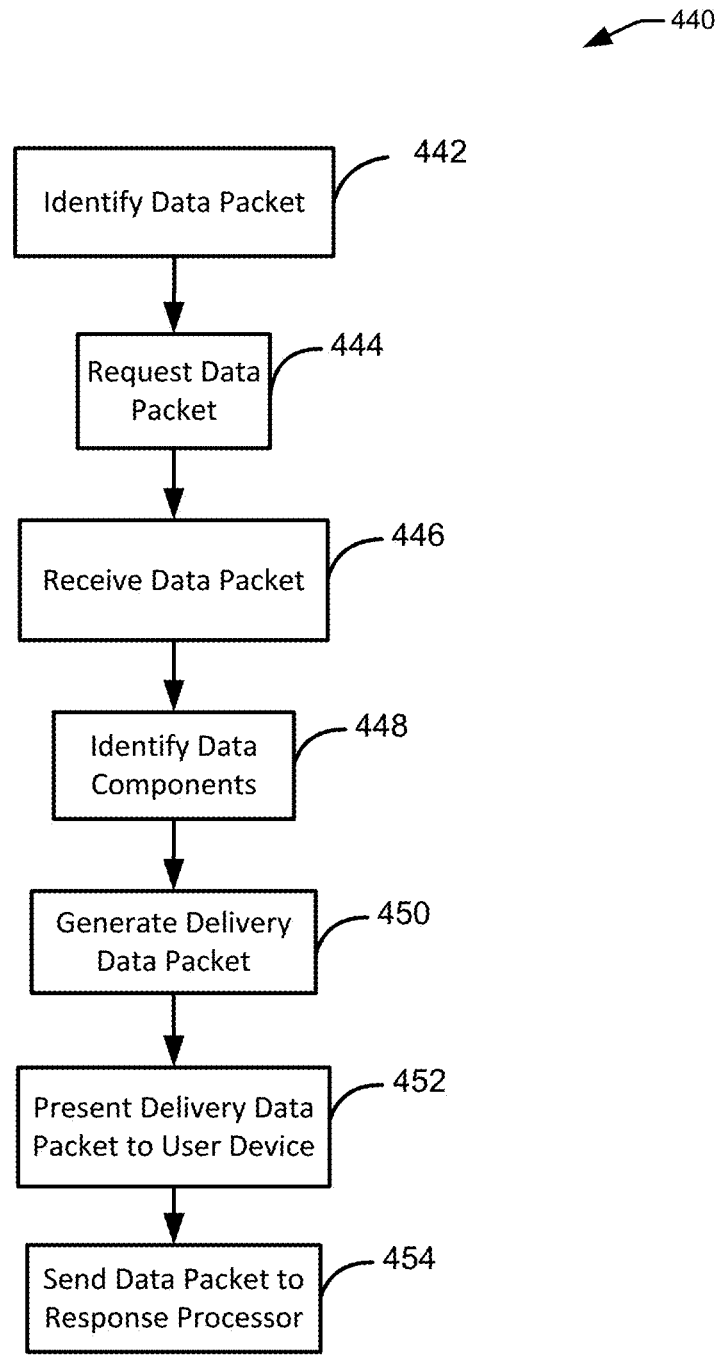
FIG. 4B is a flowchart illustrating one embodiment of a process for data management.

With reference now to FIG. 4B, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 4C:
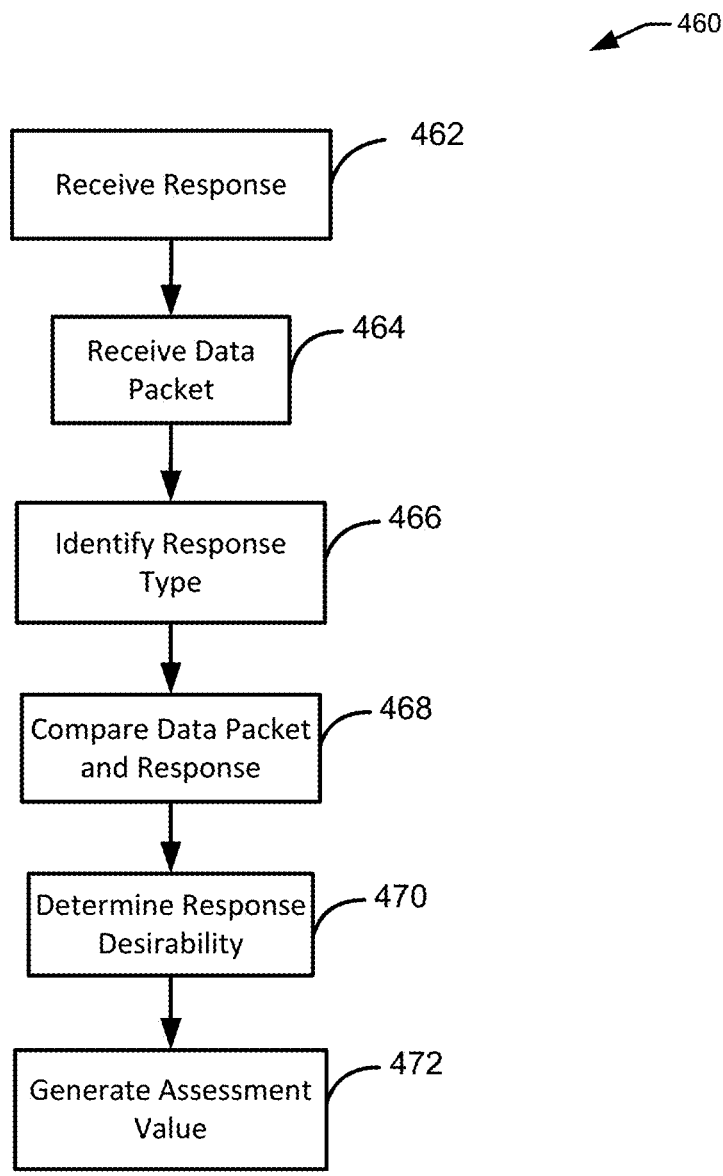
FIG. 4C is a flowchart illustrating one embodiment of a process for evaluating a response.

With reference now to FIG. 4C, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 5:
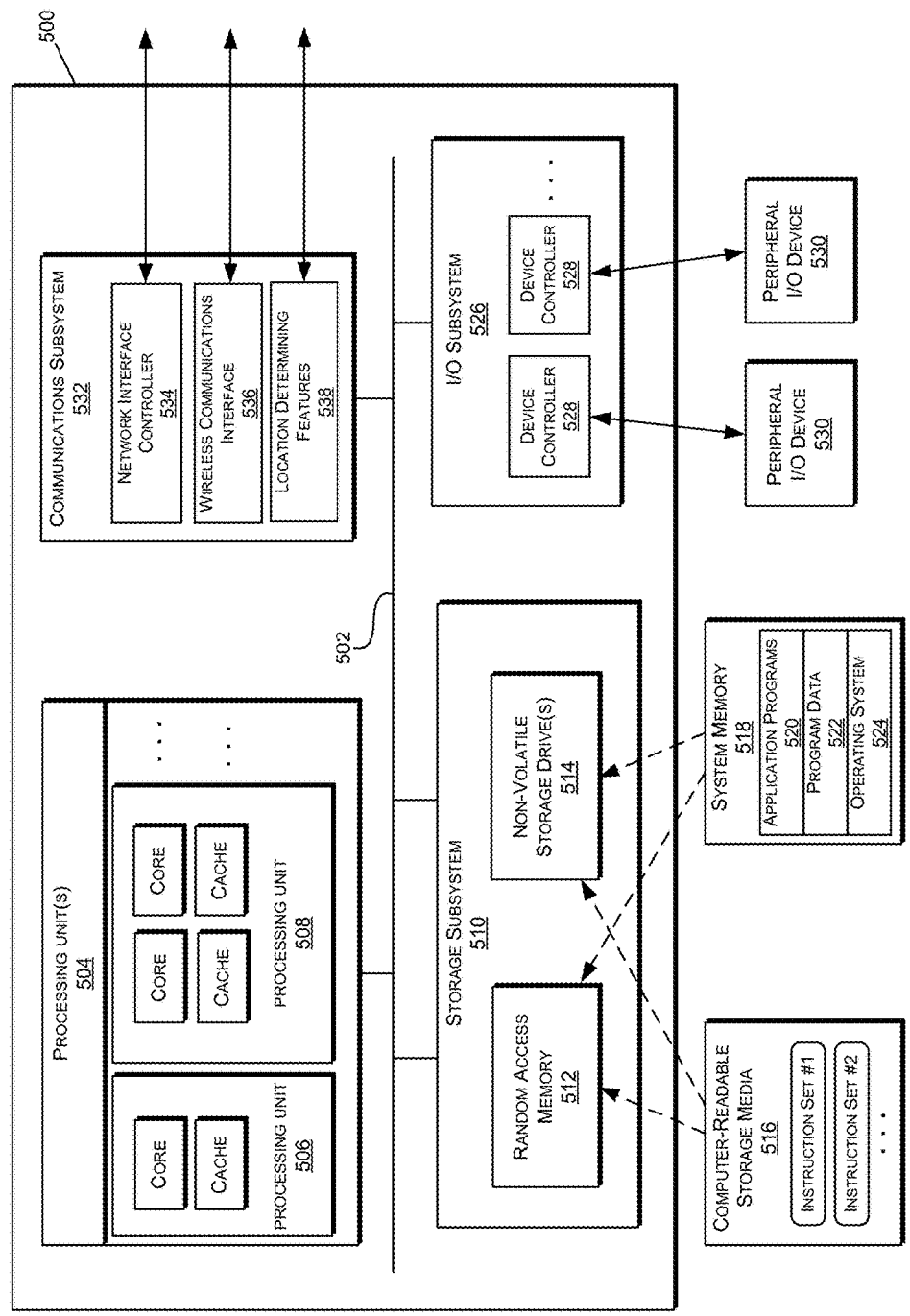
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 312). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
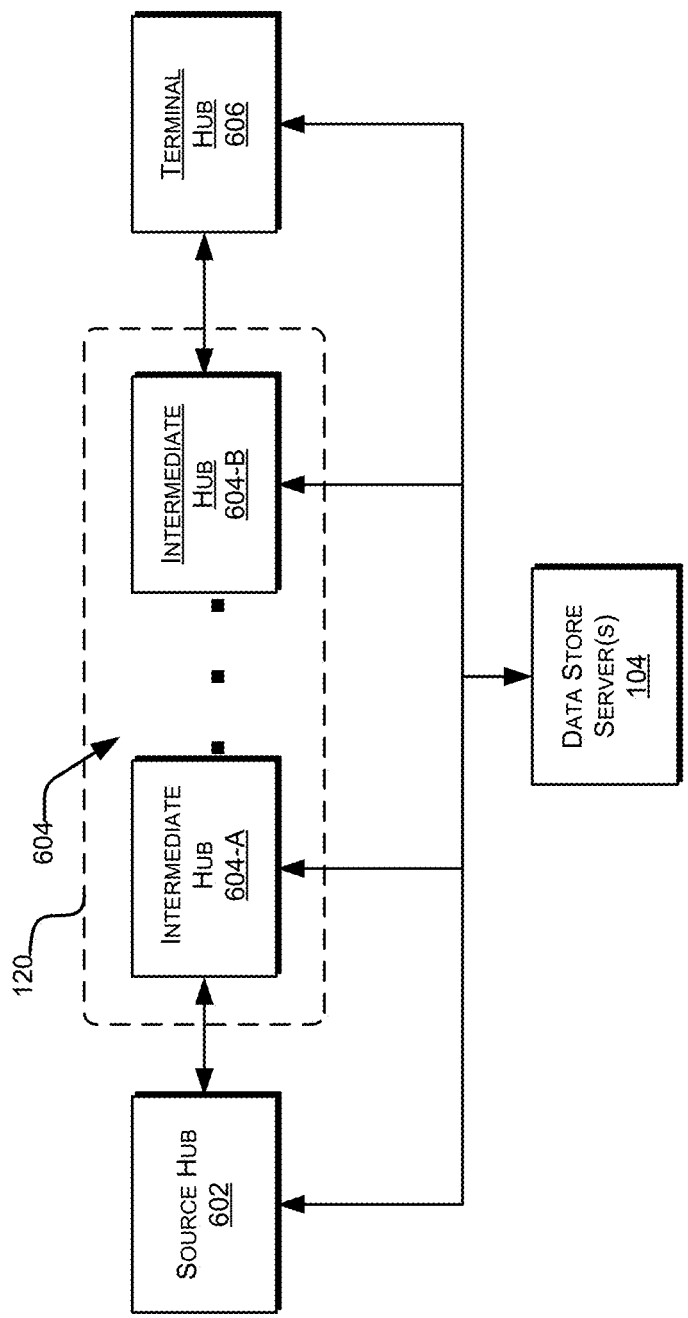
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
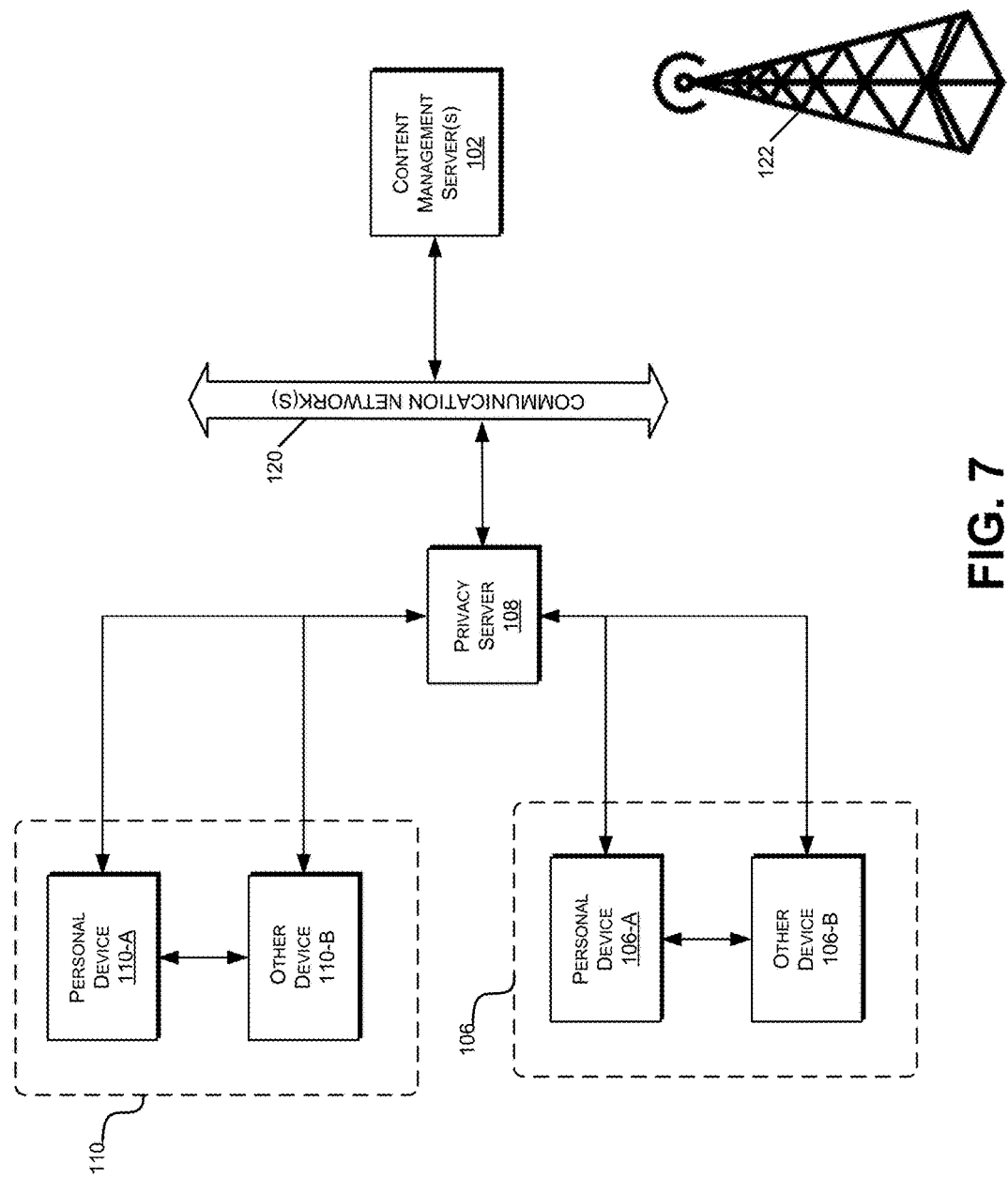
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
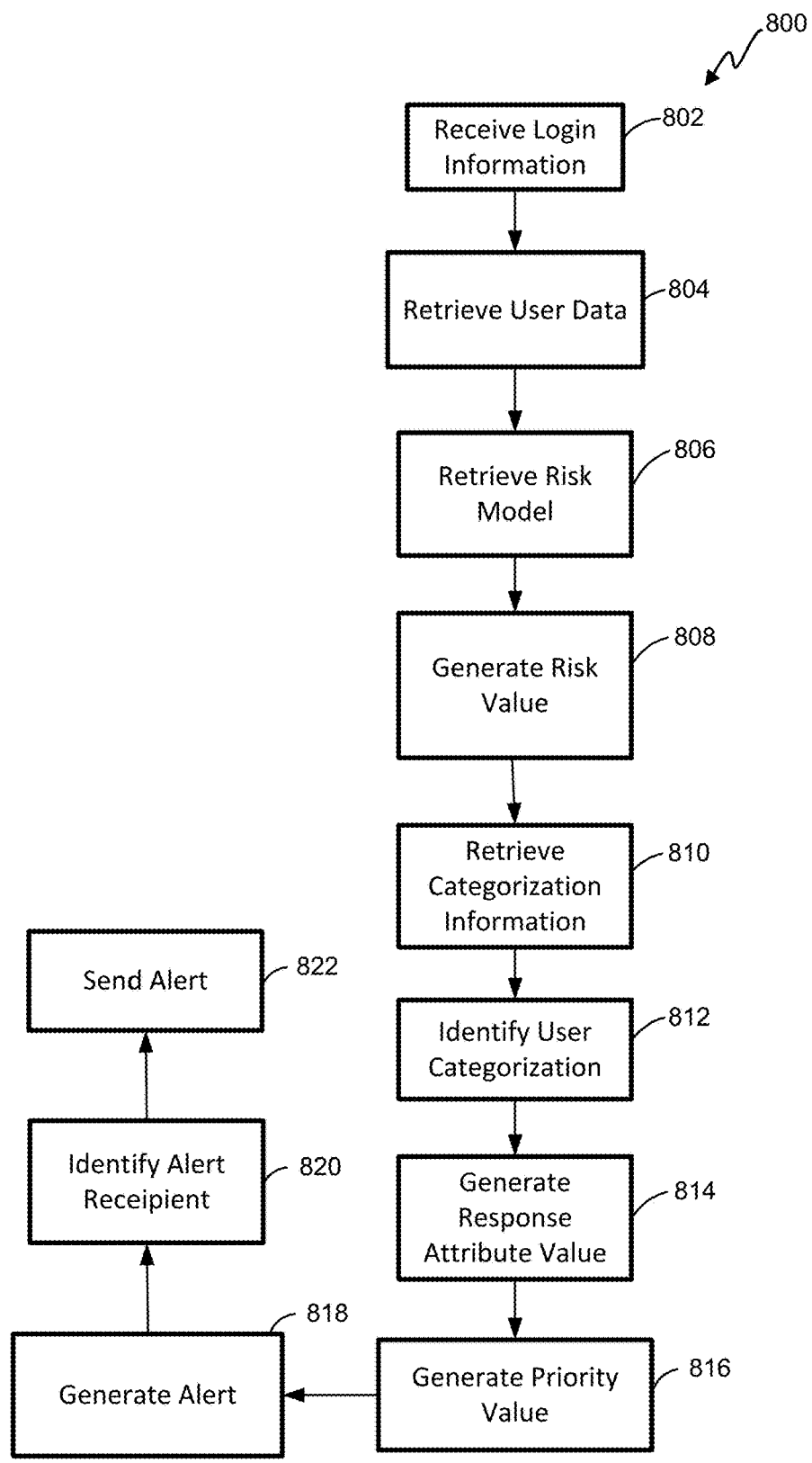
FIG. 8 is a flowchart illustrating one embodiment of a process for automatic alert provisioning via generated risk and categorization values.

With reference now to FIG. 8, a flowchart illustrating one embodiment of a process 800 for automatic alert provisioning via generated risk and categorization values is shown. The process 800 can be performed by all or portions of the content distribution network 100, and can be specifically performed by the server 102.

The process 800 begins at block 802 wherein login information is received. In some embodiments, this can include the receipt of the login information by the user device 106 from the user via the I/O subsystem 526, and the providing of the login information to the server 102 via the communication subsystem 532 of the user device 106 and the communication network 120. In some embodiments, the login information can comprise one or more of a user ID, password, a unique user identifier, or the like.

After the login information has been received, the process 800 proceeds to block 804 wherein user data is retrieved. In some embodiments, the step can include identifying the user associated with the login information, and retrieving user data for that identified user from the user profile database 301 by, for example, querying the user profile database 301 for that information.

After the user data has been retrieved, the process 800 proceeds to block 806 wherein the risk model is retrieved. In some embodiments, the retrieval of the risk model can include identification of the risk model associated with the identified user and/or associated with one or several attributes of the identified user. In some embodiments, for example, the risk model may be specific to one or several user attributes such as, for example, user age, skill level, a learning style, location, school, or the like. After the risk model has been identified, the risk model can be retrieved from the database server 104, and specifically from the model database 309 of the database server 104.

After the risk model has been retrieved, the process 800 proceeds to block 808 wherein a risk value is generated. In some embodiments, this can include, for example, extracting one or several features from the user data. In some embodiments, these one or several features can relate to one or several attributes of the user such as, for example, attendance in a course, participation in a course, grade in a course, grade on one or several assignments, or the like. In some embodiments, these one or several features can be used to generate one or several parameters, which parameters can be input into the risk model. In some embodiments, these one or several features can be directly input into the risk model. The risk model can, with the inputted features are parameters, generate a risk value is indicative of the likelihood of the user failing to achieve a predetermined outcome or objective. In some embodiments, the risk value can be compared to a threshold can delineate between acceptable and unacceptable risk levels. In some embodiments, if the risk value corresponds to an acceptable risk level, then the process 800 can terminate or can return to block 804 and proceed as outlined above when the user data is updated. Alternatively, if the risk value corresponds to an unacceptable risk level, then the process can proceed to block 810 as discussed below.

After the risk value has been generated, the process 800 proceeds to block 810 wherein categorization information is retrieved. In some embodiments, the categorization information can comprise the categorization model and/or a categorization algorithm. The categorization model and/or the categorization algorithm can be used to categorize a student-user into one or several categories based on one or several attributes of the student-user. The categorization model and/or the categorization algorithm can be retrieved by the server 102 from the model database 309.

After the categorization model and/or categorization algorithm has been retrieved, the process 800 proceeds to block 812 wherein a user categorization is identified. In some embodiments, the identification of the user categorization can include extracting one or several features or attributes of the user from the user data which can include, for example, selecting some or all of the attributes of the user identified in the user data. The identification of the user categorization can further include determining correspondents of the features and/or selected attributes to attributes, and the identification of the user categorization can include generating a value indicative of the likelihood of user belonging to a category. In some embodiments, this can include generating an inclusion value for one categorization or category out of a plurality of categorizations or categories.

In some embodiments, the identification of the user categorization can further include comparing this inclusion value to a threshold. In some embodiments, this threshold can delineate between inclusion values sufficient to indicate a category and inclusion values insufficient indicate a category. In some embodiments, a user categorization can be identified when the inclusion value meets or surpasses the threshold. Alternatively, in some embodiments, a user categorization can be identified as the category associated with the largest inclusion value for a given user. In such an embodiment the user categorization is identified as that of the categorization associated with the categorization value indicative of the greatest likelihood of the user belonging to the categorization associated with the inclusion value.

After the user categorization has been identified, the process 800 proceeds to block 814 wherein a response attribute value is generated for the user. In some embodiments, the response attribute value can identify the degree of positive or negative expected user response to an intervention or to an action. In some embodiments, the response attribute value can be associated with the identified user categorization, in the generation of the response attribute value can comprise retrieving the response attribute value associated with the identified categorization from the database server 104. In other embodiments, a plurality of user categorizations can be identified, and the response attribute value can be generated by the weighted combination of response attribute values associated with the identified categorizations and retrieved from the database server.

In some embodiments, the response attribute can indicate the effect of an action or intervention on the risk value, and in some embodiments, the response attribute can indicate the effect of one or several types of actions or interventions on the risk value. Thus, in some embodiments, the response attribute can identify one or several actions or interventions that adversely affect the risk value of the user and/or the response attribute can identify one or several actions or interventions that positively affect the risk value of the user.

After the response attribute value has been generated, the process 800 proceeds to block 816 wherein a priority value is generated. In some embodiments, the priority value can indicate the relative priority of any identified or selected intervention or action for the user. In some embodiments, the priority value can be generated based on the priority model which can be retrieved from the model database 309. The one or several features or attributes relevant to the priority model can be extracted from the user data and can be input into the priority model. The priority model can then, with the inputted features or attributes, generate the priority value.

After the priority value has been generated, the process 800 proceeds to block 818 wherein an alert is generated. In some embodiments, the alert can comprise computer code for execution by the recipient device of the alert and data for providing to the user of the recipient device of the alert. In some embodiments, the computer code can, when executed by the recipient device of the alert, trigger activation of the I/O subsystem 526 of the recipient device of the alert. In some embodiments, the activation of the I/O subsystem 526 of the recipient device of the alert can result in the providing of the data in the alert to the user of the recipient device of the alert.

In some embodiments, the data in the alert can comprise an action recommendation that can identify an action for completion. In some embodiments, the action recommendation is generated based on the response attribute, and in some embodiments, the action recommendation can identify one or several interventions for completion. In some embodiments, the action recommendation can comprise a recommendation for completion of any intervention and/or a recommendation for completion of a specified intervention. In some embodiments, such as specified intervention can be selected when the response attribute value identifies one or several interventions or intervention types as having a positive effect on the user's risk value.

After the alert has been generated, the process 800 proceeds to block 820 wherein an alert recipient is identified. In some embodiments, the alert recipient can be the intended recipient of the alert and can be, for example, the user device 106 associated with the user and/or the supervisor device 110 of the supervisor responsible for the user. After the alert recipient has been identified, the process 800 proceeds to block 822 wherein the alert is sent to the identified one or several alert recipients via, for example, the communication network 120. In some embodiments, the alert can be received which can result in the activation of the I/O subsystem 526 of the recipient device and the providing of the alert data to the user of the recipient device.

Figure 9:
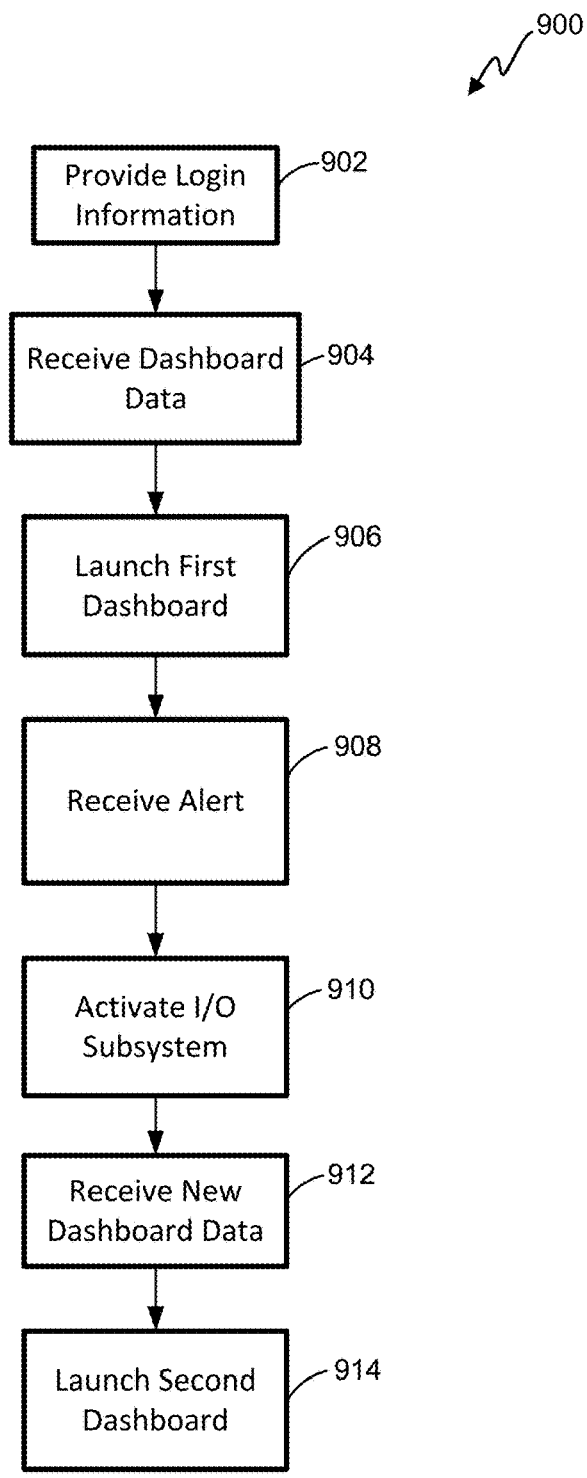
FIG. 9 is a flowchart illustrating one embodiment of a process for automatic updating of a dashboard format or architecture.

With reference now to FIG. 9, a flowchart illustrating one embodiment of a process 900 for automatic updating of a dashboard format or architecture is shown. The process 900 can be performed by all or portions of the content distribution network 100, and can be specifically performed by the user device 106 and/or the supervisor device 110.

The process 900 begins at block 902 wherein login information is provided. In some embodiments, this can include the receipt of the login information by the user device 106 from the user via the I/O subsystem 526. In some embodiments, the login information can comprise one or more of a user ID, password, a unique user identifier, or the like. After the login information has been received by the user device 106, the login information can be provided to the server 102 via the communication subsystem 532 of the user device 106 and via the communication network 120.

After the login information has been provided, the process 900 proceeds to block 904, wherein dashboard data is received. In some embodiments, the dashboard data can comprise information for the generation of the dashboard. In some embodiments, the dashboard can comprise one or several fields containing selected information. In some embodiments, this information can include, for example, performance data, participation data, course data, or the like. In some embodiments, the dashboard data can be received by the user device 106 from the server 102 via the communication network 120.

After the dashboard data has been received, the process 900 proceeds to block 906, wherein the dashboard is launched. The dashboard launched in block 906 is referred to herein as the "first dashboard" as this dashboard contains a first architecture and thus a first set of information in a first format. In some embodiments, the launch of the dashboard can include the activation of the I/O subsystem 526 to provide the first dashboard to the user of the user device 106.

After the first dashboard has been launched, the process 900 proceeds to block 908, wherein an alert is received. In some embodiments, this alert can be received from the server 102 via the communication network 120. In some embodiments, the alert can comprise computer code for execution by the user device 106 and data for providing to the user of the user device 106. In some embodiments, the computer code can, when executed by the user device 106, trigger activation of the I/O subsystem 526 of the user device 106. In some embodiments, the activation of the I/O subsystem 526 of the user device 106 can result in the providing of the data in the alert to the user of the user device 106.

After the alert has been received, the process 900 proceeds to block 910, wherein the computer code in the alert is executed by the user device 106, and the I/O subsystem 526 is activated. After the I/O subsystem 526 has been activated, the process 900 proceeds to block 912, wherein new dashboard data is received. In some embodiments, this new dashboard data can be the data included in the alert. The new dashboard data can specify, for example, a new dashboard architecture, a new dashboard format, new dashboard content, or the like. In some embodiments, this new dashboard architecture and/or new dashboard format can result in the creation of a second dashboard via commands to reformat some or all of the fields contained in the first dashboard and/or to add fields to, or remove fields from the first dashboard.

After the new dashboard data has been received, the process 900 proceeds to block 914, wherein the second dashboard is launched. In some embodiments, this can include the updating of the dashboard with the new dashboard data received in block 912, and thus the reformatting of the dashboard and/or the generation of a new dashboard architecture.

Figure 10:
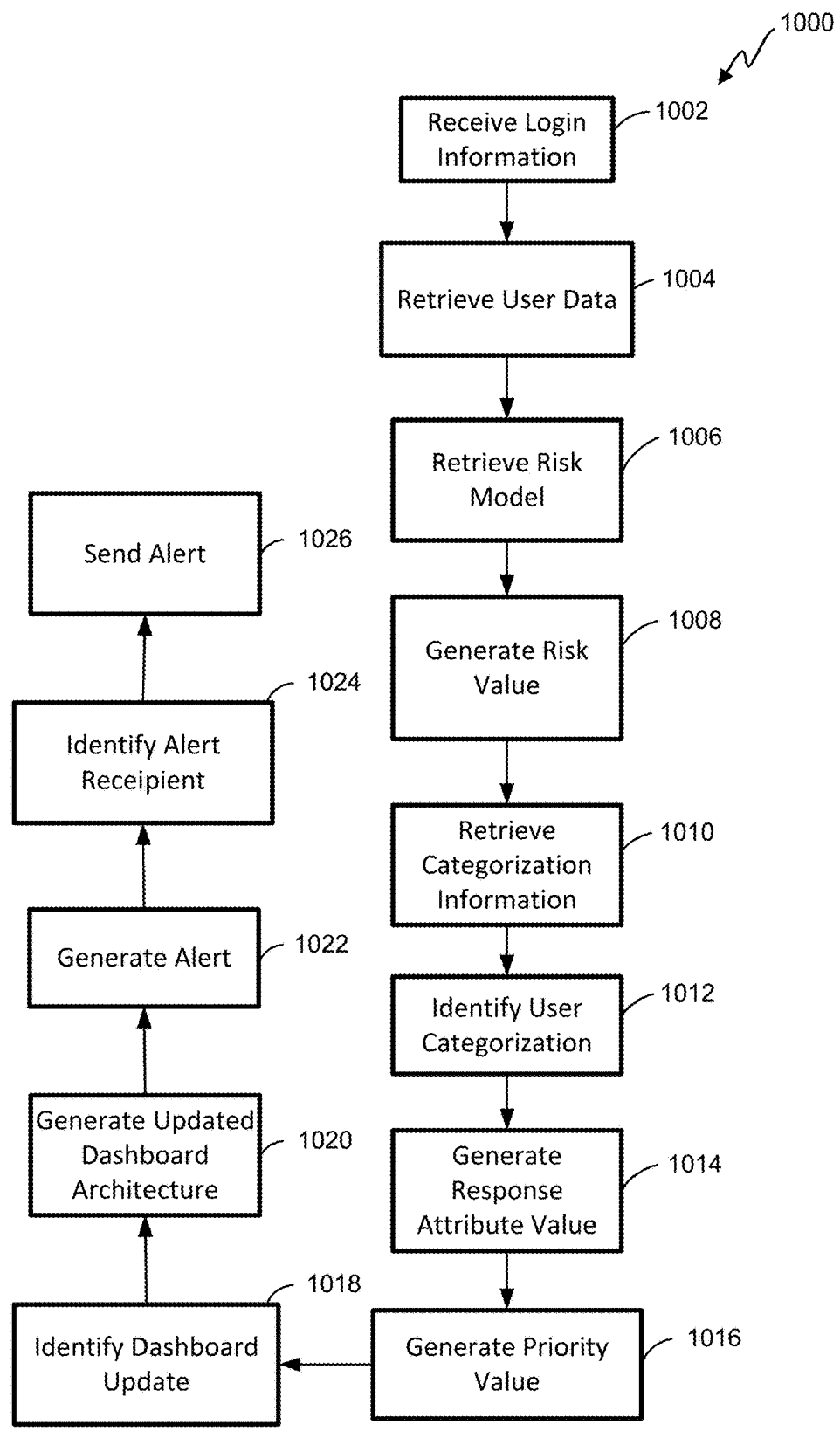
FIG. 10 is a flowchart illustrating one embodiment of a process for automatic alert provisioning to control the dashboard format or architecture.

With reference now to FIG. 10, a flowchart illustrating one embodiment of a process 1000 for automatic alert provisioning to control the dashboard format or architecture is shown. The process 1000 can be performed by all or portions of the content distribution network 100, and can be specifically performed by the server 102.

The process 1000 begins at block 1002 wherein login information is received. In some embodiments, this can include the receipt of the login information by the user device 106 from the user via the I/O subsystem 526, and the providing of the login information to the server 102 via the communication subsystem 532 of the user device 106 and the communication network 120. In some embodiments, the login information can comprise one or more of a user ID, password, a unique user identifier, or the like.

After the login information has been received, the process 1000 proceeds to block 1004 wherein user data is retrieved. In some embodiments, the step can include identifying the user associated with the login information, and retrieving user data for that identified user from the user profile database 301 by, for example, querying the user profile database 301 for that information.

After the user data has been retrieved, the process 1000 proceeds to block 1006 wherein the risk model is retrieved. In some embodiments, the retrieval of the risk model can include identification of the risk model associated with the identified user and/or associated with one or several attributes of the identified user. In some embodiments, for example, the risk model may be specific to one or several user attributes such as, for example, user age, skill level, a learning style, location, school, or the like. After the risk model has been identified, the risk model can be retrieved from the database server 104, and specifically from the model database 309 of the database server 104.

After the risk model has been retrieved, the process 1000 proceeds to block 1008 wherein a risk value is generated. In some embodiments, this can include, for example, extracting one or several features from the user data. In some embodiments, these one or several features can relate to one or several attributes of the user such as, for example, attendance in a course, participation in a course, grade in a course, grade on one or several assignments, or the like. In some embodiments, these one or several features can be used to generate one or several parameters, which parameters can be input into the risk model. In some embodiments, these one or several features can be directly input into the risk model. The risk model can, with the inputted features are parameters, generate a risk value is indicative of the likelihood of the user failing to achieve a predetermined outcome or objective. In some embodiments, the risk value can be compared to a threshold can delineate between acceptable and unacceptable risk levels. In some embodiments, if the risk value corresponds to an acceptable risk level, then the process 1000 can terminate or can return to block 1004 and proceed as outlined above when the user data is updated. Alternatively, if the risk value corresponds to an unacceptable risk level, then the process can proceed to block 1010 as discussed below.

After the risk value has been generated, the process 1000 proceeds to block 1010 wherein categorization information is retrieved. In some embodiments, the categorization information can comprise the categorization model and/or a categorization algorithm. The categorization model and/or the categorization algorithm can be used to categorize a student-user into one or several categories based on one or several attributes of the student-user. The categorization model and/or the categorization algorithm can be retrieved by the server 102 from the model database 309.

After the categorization model and/or categorization algorithm has been retrieved, the process 1000 proceeds to block 1012 wherein a user categorization is identified. In some embodiments, the identification of the user categorization can include extracting one or several features or attributes of the user from the user data which can include, for example, selecting some or all of the attributes of the user identified in the user data. The identification of the user categorization can further include determining correspondents of the features and/or selected attributes to attributes, and the identification of the user categorization can include generating a value indicative of the likelihood of user belonging to a category. In some embodiments, this can include generating an inclusion value for one categorization or category out of a plurality of categorizations or categories.

In some embodiments, the identification of the user categorization can further include comparing this inclusion value to a threshold. In some embodiments, this threshold can delineate between inclusion values sufficient to indicate a category and inclusion values insufficient indicate a category. In some embodiments, a user categorization can be identified when the inclusion value meets or surpasses the threshold. Alternatively, in some embodiments, a user categorization can be identified as the category associated with the largest inclusion value for a given user. In such an embodiment the user categorization is identified as that of the categorization associated with the categorization value indicative of the greatest likelihood of the user belonging to the categorization associated with the inclusion value.

After the user categorization has been identified, the process 1000 proceeds to block 1014 wherein a response attribute value is generated for the user. In some embodiments, the response attribute value can identify the degree of positive or negative expected user response to an intervention or to an action. In some embodiments, the response attribute value can be associated with the identified user categorization, in the generation of the response attribute value can comprise retrieving the response attribute value associated with the identified categorization from the database server 104. In other embodiments, a plurality of user categorizations can be identified, and the response attribute value can be generated by the weighted combination of response attribute values associated with the identified categorizations and retrieved from the database server.

In some embodiments, the response attribute can indicate the effect of an action or intervention on the risk value, and in some embodiments, the response attribute can indicate the effect of one or several types of actions or interventions on the risk value. Thus, in some embodiments, the response attribute can identify one or several actions or interventions that adversely affect the risk value of the user and/or the response attribute can identify one or several actions or interventions that positively affect the risk value of the user.

After the response attribute value has been generated, the process 1000 proceeds to block 1016 wherein a priority value is generated. In some embodiments, the priority value can indicate the relative priority of any identified or selected intervention or action for the user. In some embodiments, the priority value can be generated based on the priority model which can be retrieved from the model database 309. The one or several features or attributes relevant to the priority model can be extracted from the user data and can be input into the priority model. The priority model can then, with the inputted features or attributes, generate the priority value.

After the priority value has been updated, the process 1000 proceeds to block 1018, wherein a dashboard update is identified. In some embodiments, the dashboard update can be identified and/or selected based on the response attribute value. Thus, in some embodiments, the dashboard update can be selected that most positively affects the risk value to thereby decrease the risk of the user failing to achieve the predetermined objective. In some embodiments, the dashboard update can be identified in and/or selected from one or several potential dashboard updates stored in the dashboard database 310.

After the dashboard update has been identified, the process 1000 proceeds to block 1020, wherein updated dashboard architecture, or as referred to in block 912 of FIG. 9, the new dashboard data, is generated. In some embodiments, this step can comprise the generation and/or retrieval of computer code, that when executed by, for example, a recipient device 106, 110, creates the second dashboard having a second format, second architecture, and/or second content. In some embodiments, this computer code can be retrieved from the dashboard database 310.

After the updated dashboard architecture has been generated, the process 1000 proceeds to block 1022 wherein an alert is generated. In some embodiments, the alert can comprise computer code for execution by the recipient device of the alert and data for providing to the user of the recipient device of the alert. In some embodiments, the computer code can, when executed by the recipient device of the alert, trigger activation of the I/O subsystem 526 of the recipient device of the alert. In some embodiments, the activation of the I/O subsystem 526 of the recipient device of the alert can result in the providing of the data in the alert to the user of the recipient device of the alert. In some embodiments, the data in the alert can comprise the updated dashboard architecture generated in block 1020.

After the alert has been generated, the process 1000 proceeds to block 1024 wherein an alert recipient is identified. In some embodiments, the alert recipient can be the intended recipient of the alert and can be, for example, the user device 106 associated with the user and/or the supervisor device 110 of the supervisor responsible for the user. After the alert recipient has been identified, the process 1000 proceeds to block 1026 wherein the alert is sent to the identified one or several alert recipients via, for example, the communication network 120. In some embodiments, the alert can be received which can result in the activation of the I/O subsystem 526 of the recipient device and the providing of the alert data to the user of the recipient device.

Figure 11:
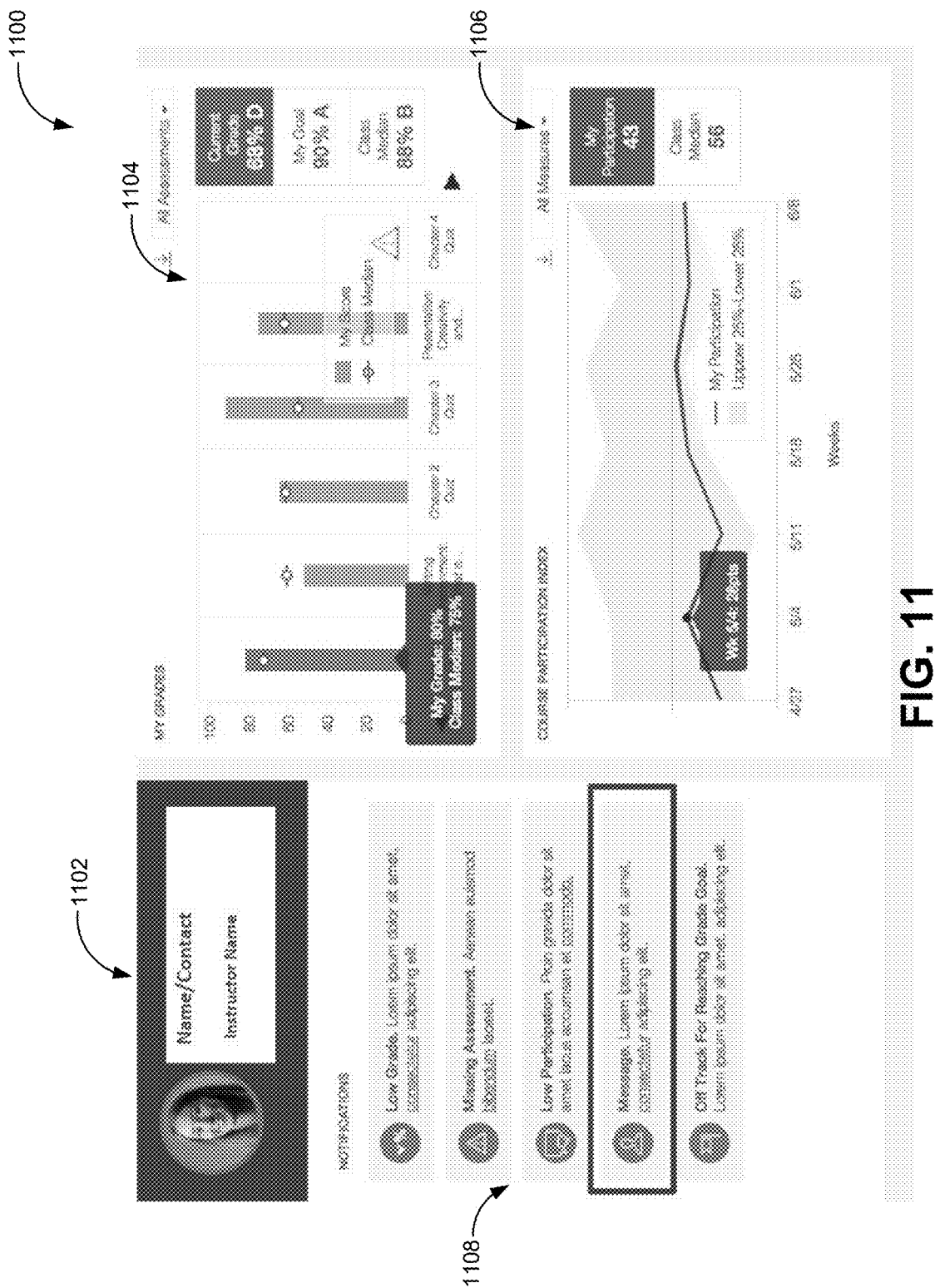
FIG. 11 is a graphical depiction of one embodiment of a dashboard.

With reference now to FIG. 11, a graphical depiction of one embodiment of a dashboard 1100 is shown. The dashboard 1100 can be generated by the I/O subsystem 526 of one or more of the devices 106, 110. The dashboard 1100 can include an identification field 1102 comprising user identification information and/or instructor or supervisor identification information. The dashboard 1100 can include a performance field 1104 which can contain information characterizing the performance of the user identified in the identification field 1102 of the dashboard 1100. In some embodiments, the performance field 1104 can comprise a visual representation of performance information in the form of one or several graphs.

The dashboard 1100 can include a participation field 1106 which can contain information relating to, or characterizing the participation of the user identified in the identification field 1102 of the dashboard 1100 in one or several courses. In some embodiments, this field can comprise a visual representation of participation information in the form of one or several graphs. As depicted in FIG. 11, this graph can indicate relative performance of the user identified in the identification field 1102 of the dashboard 1100 with respect to one or several peers. The dashboard 1100 can further include a notification field 1108 which can comprise one or several notifications and/or links.

Figure 12:
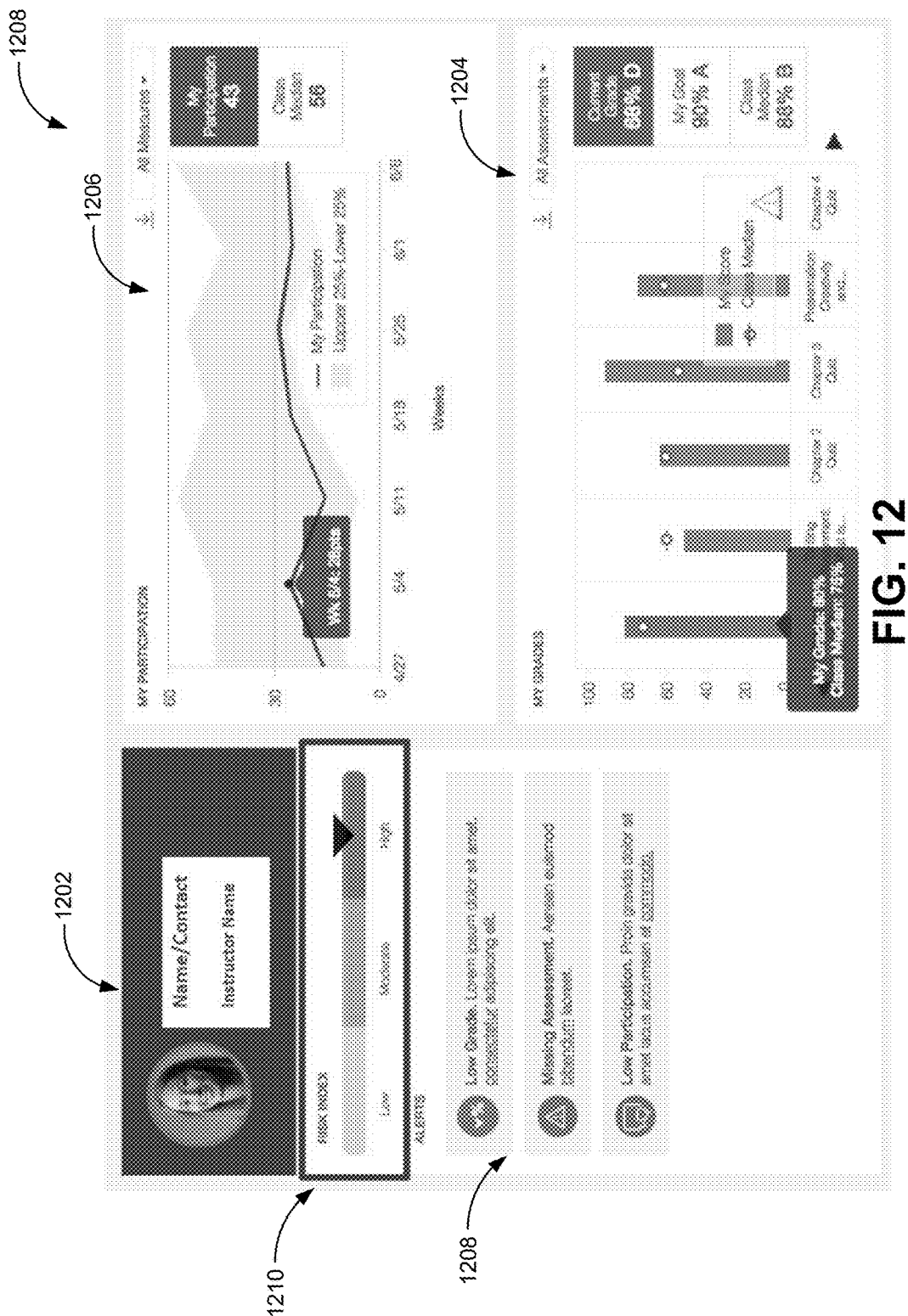
FIG. 12 is a graphical depiction of one embodiment of a dashboard with an updated architecture or format.

With reference now to FIG. 12, a graphical depiction of one embodiment of a dashboard 1200 with an updated architecture or format is shown. The dashboard 1200 includes an identification field 1202, a performance field 1204, a participation field 1206, a notification field 1208, and a risk field 1210. Thus, in comparison to dashboard 1100, the dashboard 1200 includes the additional risk field 1210, which risk field includes a graphical depiction of the degree of risk of the user identified in the identification field 1202 of the dashboard 1200 failing to achieve the predetermined outcome. Further, the dashboard 1200 differs from the dashboard 1100 in that the notification field 1208 is smaller than the notification field 1108, and the positions of the performance field 1204 and the participation field 1206 are switched. In some embodiments, these different formats and/or architectures of the dashboard 1200 can be selected to positively affect the user risk value.

Figure 13:
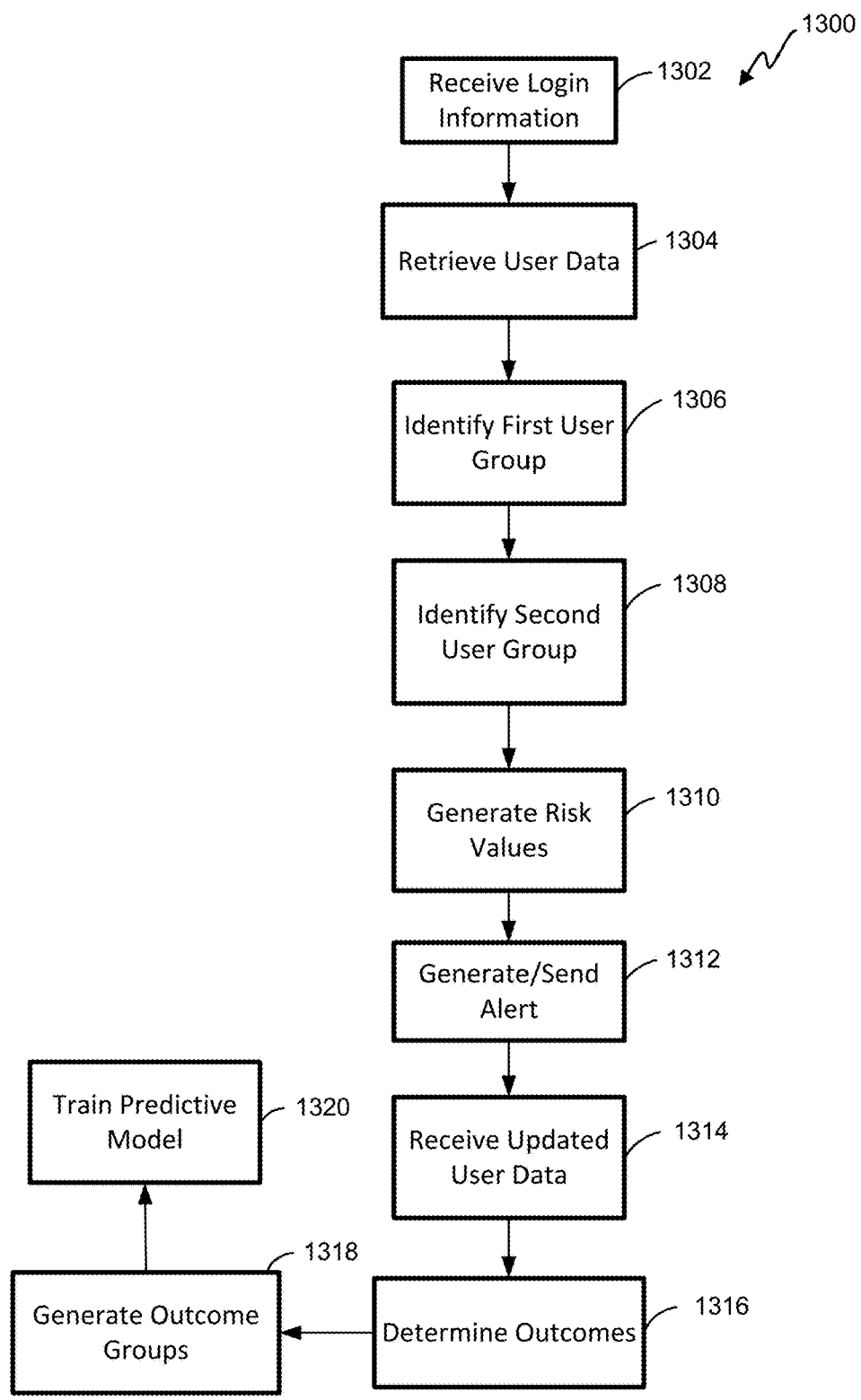
FIG. 13 is a flowchart illustrating one embodiment of a process for automatic generation of a categorization model.

With reference now to FIG. 13, a flowchart illustrating one embodiment of a process 1300 for automatic generation of a categorization model is shown. In some embodiments, this process can be used to generate the categorization model which can be stored in the model database 309 and can be used by the processes 800 and 1000. The process 1300 can be performed by all or portions of the content distribution network 100, and can be specifically performed by the server 102.

The process 1300 begins at block 1302 wherein login information is received. In some embodiments, this can include the receipt of the login information by the user device 106 from the user via the I/O subsystem 526, and the providing of the login information to the server 102 via the communication subsystem 532 of the user device 106 and the communication network 120. In some embodiments, the login information can comprise one or more of a user ID, password, a unique user identifier, or the like. In some embodiments, the login information can comprise login information for a plurality of users over a specified time period such as, for example, one hour, six hours, one day, one week, one month, six months, one year, or the like.

After the login information has been received, the process 1300 proceeds to block 1304 wherein user data is retrieved. In some embodiments, the step can include identifying the user (s) associated with the login information, and retrieving user data for that identified user(s) from the user profile database 301 by, for example, querying the user profile database 301 for that information.

After the user data has been retrieved, the process 1300 proceeds to block 1306 and 1308 wherein first and second user groups are identified. In some embodiments, the first and second user groups can be randomly selected from the users for whom user data was retrieved in block 1304. In some embodiments, the first and second user groups can be identified and/or selected such that the first and second user groups comprise similar samples of user in that the distributions of user attributes is similar between the first and second user groups.

After the first and second user groups have been identified, the process 1300 proceeds to block 1310, wherein risk values are generated. In some embodiments, a unique risk value is generated for some or all of the users in each of the first and second user groups.

In some embodiments, this can include, for example, extracting one or several features from the user data for some or all of the users in the first and second user groups. In some embodiments, these one or several features can relate to one or several attributes of these users such as, for example, attendance in a course, participation in a course, grade in a course, grade on one or several assignments, or the like. In some embodiments, these one or several features can be used to generate one or several parameters, which parameters can be input into the risk model. In some embodiments, these one or several features can be directly input into the risk model. The risk model can, with the inputted features are parameters, generate a risk value is indicative of the likelihood of the user failing to achieve a predetermined outcome or objective. In some embodiments, the risk value can be compared to a threshold can delineate between acceptable and unacceptable risk levels. In some embodiments, if a user's risk value corresponds to an acceptable risk level, then the process 1300 can terminate. Alternatively, if a user's risk value corresponds to an unacceptable risk level, then the process 1300 can proceed to block 1310 as discussed below.

After the risk values have been generated, the process 1300 proceeds to block 1312, wherein alerts are generated and sent. In some embodiments, an alert can be generated and sent for each of the users having a sufficient risk value to be unacceptable. In some embodiments, the alert can be generated and sent for only those users having a sufficient risk value to be unacceptable and that are in the first user group. In some embodiments, the alert can comprise computer code to activate the I/O subsystem 526 of one or several devices 106, 110 upon receipt of the alert, and the alert can comprise data identifying an action or intervention.

After the alert has been generated and sent, the process 1300 proceeds to block 1314, wherein updated user data is received. In some embodiments, this user data can be updated to reflect whether the users in the first and second groups achieved the predetermined outcomes and/or to indicate progress towards achieved of the predetermined outcomes. After the user data has been received, the process 1300 proceeds to block 1316, wherein user outcomes are determined. In some embodiments, these user outcomes are determined based on the updated user data. Specifically, in some embodiments, the updated user data can be used to determine whether the user achieved the predetermined outcome.

After the outcomes have been determined, the process 1300 proceeds to block 1318, wherein one or several outcome groups are generated. In some embodiments, an outcome group can be generated from one or several users having the same outcome. In some embodiments, these outcome groups can be further defined according to one of several traits of the users having the same outcome. In some embodiments, the outcome groups can be stored in the database server 104, and particularly in the model database 309.

After the outcome groups have been generated, the process 1300 proceeds to block 1320, wherein the categorization model is trained. In some embodiments, this can include the extracting a plurality of features and/or attributes of users in each of the outcome groups and providing those to the server 102. In some embodiments, the server 102 can perform predictive analytics to identify one or several features and/or attributes, or parameters generated from the one or several features and/or attributes, that predict user inclusion in an outcome group. In some embodiments, the predictive model can be trained based on one or both of the first and second user groups, or subsets of one or both of the first and second user groups. The predictive model can be stored in the database server 104, and specifically can be stored in the model database 304.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for remote intervention comprising:
   memory comprising:
   a user profile database comprising information identifying one or several attributes of a user; and
   a model database comprising a risk model and categorization data identifying a plurality of alert categories;
   a user device comprising:

a first network interface configured to exchange data via the communication network; and
a first I/O subsystem configured to convert electrical signals to user interpretable outputs via a user interface;
a supervisor device comprising:
a second network interface configured to exchange data via the communication network; and
a second I/O subsystem configured to convert electrical signals to user interpretable outputs via a user interface; and
a content management server, wherein the content management server is configured to:
receive data identifying a user of the user device;
retrieve user data for the user from the user profile database;
retrieve a risk model from the model database;
input the user data into the risk model to generate a risk value, wherein the risk value is indicative of the likelihood of the user failing to achieve a predetermined outcome;
identify a user categorization according to a classification algorithm;
determine a response attribute for the user, wherein the response attribute identifies the degree of a positive or negative user response to an intervention;
generate an action recommendation identifying an action for completion, wherein the action recommendation is generated based on the response attribute;
generate and send an alert to the supervisor device, wherein the alert comprises the action recommendation, and wherein the alert comprises computer code to trigger activation of the I/O subsystem of the supervisor device to provide the action recommendation; and
select, based on the response attribute, from a plurality of potential dashboard updates stored in a dashboard database, a dashboard update, wherein the dashboard update:
positively affects the risk value, and decreases the risk value of the user failing to achieve the predetermined outcome;
includes, on a second dashboard, a new dashboard data, dashboard architecture, and dashboard content that was not displayed on a first dashboard, the new dashboard data, dashboard architecture, and dashboard content including the alert; and
includes an identification field, a performance field, a participation field, and a notification field displayed in a different position on the second dashboard than on an original position on the first dashboard, wherein the new dashboard data, dashboard architecture, and dashboard content includes a risk field including a graphical depiction of the risk value indicative of the likelihood of the user failing to achieve the predetermined outcome.

2. The system of claim 1, wherein identifying the user categorization according to the classification algorithm comprises:
selecting some of the one or several attributes of the user identified in the user data;
determining correspondence of the selected some of the one or several attributes to attributes of each of a plurality of categorizations; and
generating an inclusion value for one categorization of the plurality of categorizations, wherein the inclusion value is indicative of a likelihood of the user belonging to that one categorization.

3. The system of claim 2, wherein identifying the user categorization according to the classification algorithm further comprises: identifying the user categorization as that of the one categorization when the inclusion value is larger than a threshold value.

4. The system of claim 2, wherein the plurality of categorizations comprise: a first category associated with decreased risk in response to an action; and a second category associated with increased risk in response to an action.

5. The system of claim 1, wherein identifying the user categorization according to the classification algorithm comprises:
selecting some of the one or several attributes of the user identified in the user data;
determining correspondence of the selected some of the one or several attributes to attributes to each of a plurality of categorizations;
generating inclusion values for each of the plurality of categorizations, wherein each inclusion value is indicative of a likelihood of the user belonging to a categorization of the plurality of categorizations associated with the inclusion value; and
identifying the user categorization as that of the categorization associated with the categorization value indicative of the greatest likelihood of the user belonging to the categorization associated with the inclusion value.

6. The system of claim 1, wherein the action recommendation identifies an intervention.

7. The system of claim 6, wherein the risk model comprises a machine learning model.

8. The system of claim 7, wherein the machine learning model comprises a decision tree learning model.

9. The system of claim 1, wherein the content management server is further configured to: generate a priority value indicative of relative priority of the action associated with the action recommendation; and wherein the alert comprises the priority value.

10. A method for remote intervention comprising:
receiving at a content management server data identifying a user of a user device, wherein the user device comprises: a first network interface configured to exchange data via the communication network; and a first I/O subsystem configured to convert electrical signals to user interpretable outputs via a user interface;
retrieving user data for the user comprising information identifying one or several attributes of the user from a user profile database;
retrieving a risk model from a model database;
automatically inputting the user data into the risk model with the content management server to generate a risk value, wherein the risk value is indicative of the likelihood of the user failing to achieve a predetermined outcome;
identifying with the content management server a user categorization according to a classification algorithm;
determining a response attribute for the user with the content management server, wherein the response attribute identifies the degree of a positive or negative user response to an intervention;
generating an action recommendation with the content management server, wherein the action recommendation identifies an action for completion, and wherein the action recommendation is generated based on the response attribute; and generating and sending an alert to a supervisor device from the content management server, wherein the alert comprises the action recommendation, and wherein the alert comprises computer code to trigger activation of an I/O subsystem of the supervisor device to provide the action recommendation to a supervisor-user selecting, based on the response attribute, from a plurality of potential dashboard updates stored in a dashboard database, a dashboard update, wherein the dashboard update:

positively affects the risk value, and decreases the risk value of the user failing to achieve the predetermined outcome;

includes, on a second dashboard, a new dashboard data, dashboard architecture, and dashboard content that was not displayed on a first dashboard, the new dashboard data, dashboard architecture, and dashboard content including the alert; and includes an identification field, a performance field, a participation field, and a notification field displayed in a different position on the second dashboard than on an original position on the first dashboard, wherein the new dashboard data, dashboard architecture, and dashboard content includes a risk field including a graphical depiction of the risk value indicative of the likelihood of the user failing to achieve the predetermined outcome.

11. The method of claim 10, wherein identifying the user categorization according to the classification algorithm comprises:

selecting some of the one or several attributes of the user identified in the user data;

determining correspondence of the selected some of the one or several attributes to attributes of each of a plurality of categorizations; and generating an inclusion value for one categorization of the plurality of categorizations, wherein the inclusion value is indicative of a likelihood of the user belonging to that one categorization.

12. The method of claim 11, wherein identifying the user categorization according to the classification algorithm further comprises: identifying the user categorization as that of the one categorization when the inclusion value is larger than a threshold value.

13. The method of claim 11, wherein the plurality of categorizations comprise: a first category associated with decreased risk in response to an action; and a second category associated with increased risk in response to an action.

14. The method of claim 10, wherein identifying the user categorization according to the classification algorithm comprises:

selecting some of the one or several attributes of the user identified in the user data;

determining correspondence of the selected some of the one or several attributes to attributes to each of a plurality of categorizations;

generating inclusion values for each of the plurality of categorizations, wherein each inclusion value is indicative of a likelihood of the user belonging to a categorization of the plurality of categorizations associated with the inclusion value; and identifying the user categorization as that of the categorization associated with the categorization value indicative of the greatest likelihood of the user belonging to the categorization associated with the inclusion value.

15. The method of claim 10, wherein the action recommendation identifies an intervention.

16. The method of claim 15, wherein the risk model comprises a machine learning model.

17. The method of claim 16, wherein the machine learning model comprises a decision tree learning model.

18. The method of claim 10 further comprising: generating a priority value indicative of relative priority of the action associated with the action recommendation; and wherein the alert comprises the priority value.

* * * * *